Figure 1:
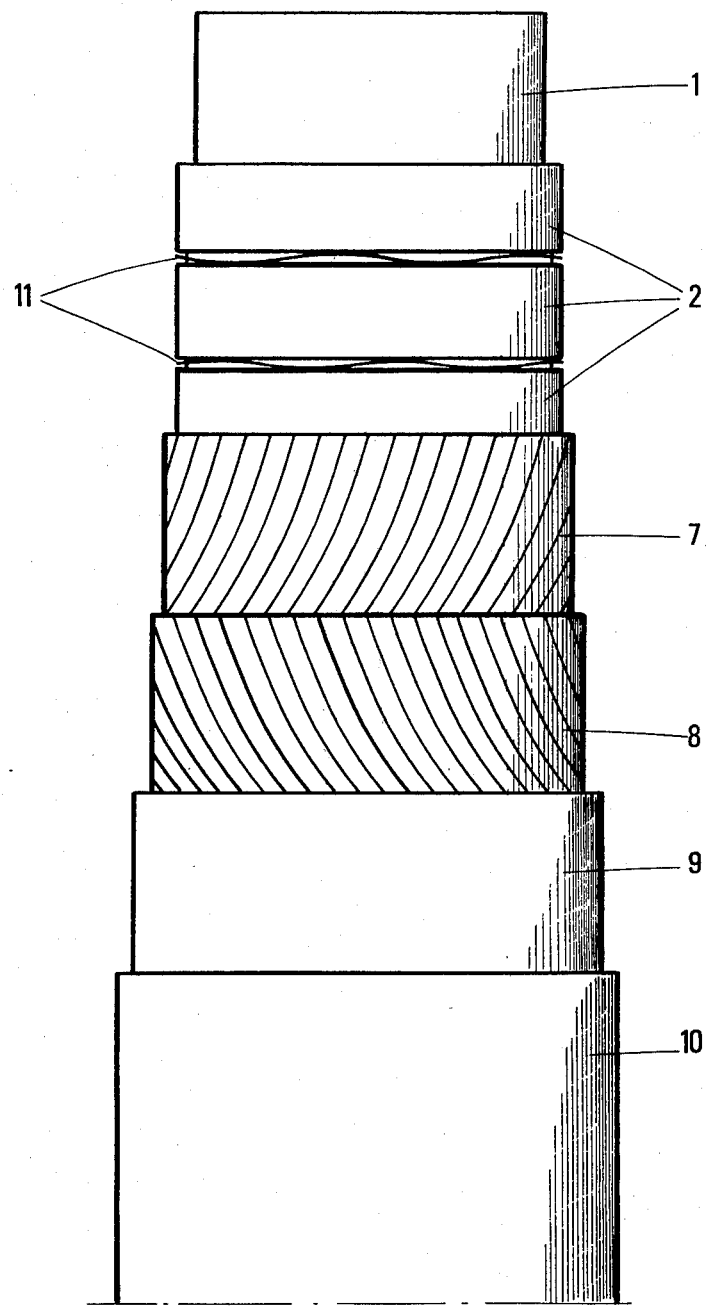

United States Patent [19]

Bournazel et al.

[11] 3,908,703

[45] Sept. 30, 1975

[54] ARMOURED FLEXIBLE PIPE STRUCTURE

[75] Inventors: Claude Bournazel, Cernay-la-Ville; Michel Chatard, Chatou; Pierre Grolet, Orgerus, all of France

[73] Assignee: Institut Francais du Petrole, des Carburants et Lubrifiants, France

[22] Filed: Feb. 5, 1974

[21] Appl. No.: 439,716

[30] Foreign Application Priority Data

Feb. 15, 1973 France............................. 73.05453

[52] U.S. Cl. ................. 138/120; 138/137; 138/155
[51] Int. Cl.² ..................... F16L 11/18; F16L 11/00
[58] Field of Search ........... 138/100, 101, 102, 118, 138/118.1, 120, 140, 147, 155, 137, 138, 139

[56] References Cited
UNITED STATES PATENTS 899,623  9/1908  Royer ................................. 138/139
2,136,770  11/1938  Witzenmann ........................ 138/120
3,674,014  7/1972  Tillander ............................. 138/120

OTHER PUBLICATIONS

Heating, Piping & Air Conditioning; Vol. 31, No. 1, January 1959, p. 229.

Primary Examiner—Harry N. Haroian
Assistant Examiner—Richard R. Stearns
Attorney, Agent, or Firm—Craig & Antonelli

[57] ABSTRACT

This structure comprises an armouring formed by the combination of a succession of rings each having two annular grooves in its internal wall, in the vicinity of the end faces of the ring, and separate annular elements interconnecting adjacent rings of the armouring, the cross section of these elements being shaped as a flattened U and having two arms engaged with some clearance in the two annular grooves, respectively.

15 Claims, 6 Drawing Figures

ARMOURED FLEXIBLE PIPE STRUCTURE

The present invention relates to a new armoured flexible pipe structure.

Although this new structure is suitable for pipes of any diameter, it is of particular interest for constructing large diametered pipes, useful for example, as immersed pipe lines for conveying the oil or gas produced by underwater wellheads.

In this particular use, the pipes must withstand a high hydrostatic pressure which increases with the immersion depth, together with a high internal pressure exerted by the conveyed fluid.

Such pipes must also be very flexible and of high mechanical resistance, in veiw of the stresses resulting from the sea swell or the forces developed when the pipe is positioned.

The main objects of the prior techniques are either to manufacture large diametered pipes, which are buoyant or can be immersed at a small depth, or to construct pipes which can withstand high hydrostatic pressures but are of small diameter.

In the first case the prior pipes have a tubular core of plastic or elastomeric material wherein are embedded metal elements capable of withstanding the internal pressure.

This technique cannot be used when the immersion depth (and consequently the external hydrostatic pressure) is too high, since it is not possible to manufacture pipes having a substantially rigid cross section and which still exhibit a sufficient flexiblity.

In the second case the pressure-withstanding pipe structure is formed by a helically wound profiled steel wire, so as to form interlocking adjacent convolutions of the helical winding.

Such a technique can be used as long as the required cross section of the wires is not too large. However, this cross section varies, for a given resistance to external and internal pressures, in proportion to the square of the pipe diameter. It is then apparent that this technique is not suitable for constructing flexible pipes of a larger diameter than 30 cm, which can withstand high internal and hydrostatic pressures.

Figure 4:
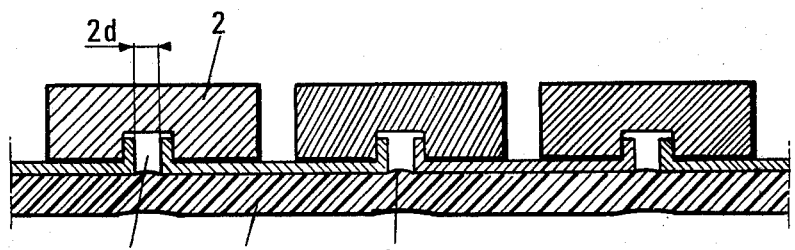
Figure 3:
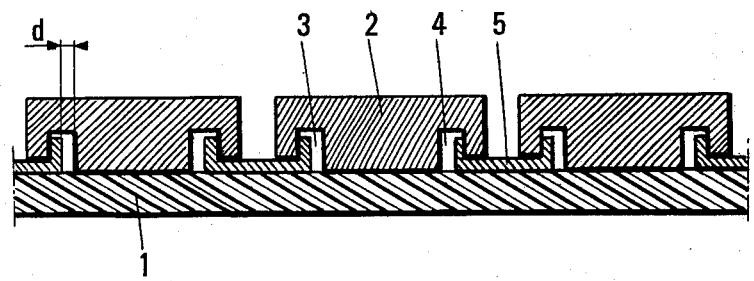
Figure 2:
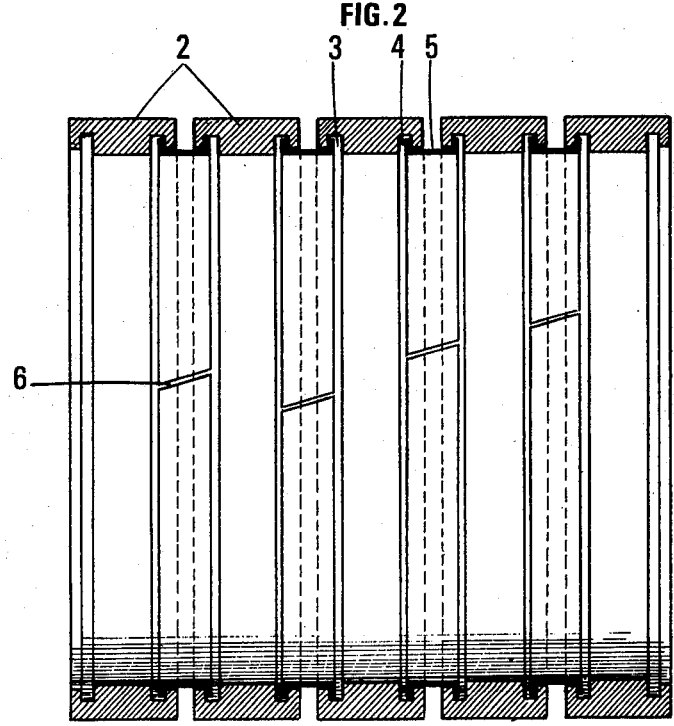
Figure 5:
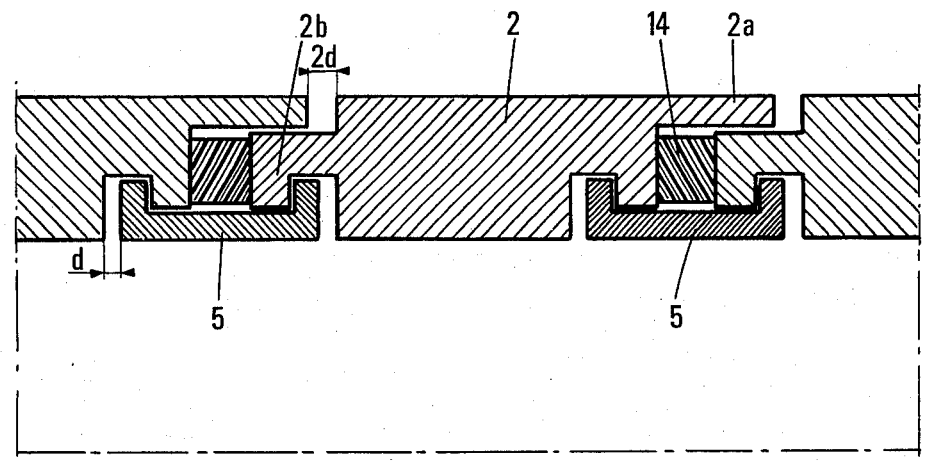
Figure 6:
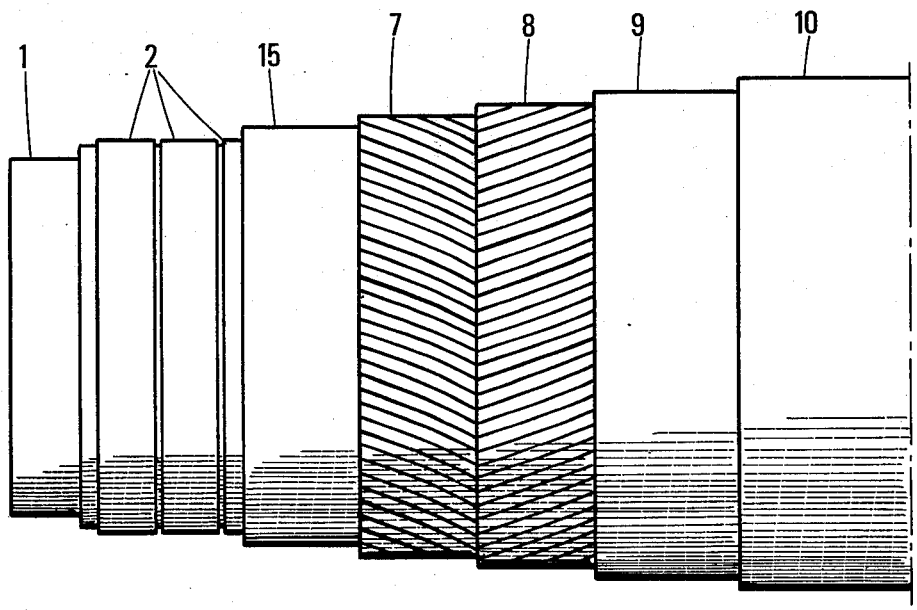

Non limitative embodiments of the invention will now be described with reference to the accompanying drawings, wherein:

FIG. 1 illustrates a structure of a flexible pipe according to the invention,

FIG. 2 diagrammatically shows a longitudinal cross section of the internal armouring of this pipe, FIG. 3 shows the rings of this structure in position of maximum spacing, FIG. 4 shows, by way of comparison, the drawback exhibited by a structure which is somewhat different from that according to the invention, FIG. 5 illustrates an improvement to the embodiment of FIG. 3, FIG. 6 shows a modification of the embodiment illustrated by FIG. 1.

FIG. 1 illustrates a flexible pipe according to the invention, comprising a tubular core 1 which may be made of an elastomeric or plastic material impervious to the fluid conveyed through the pipe.

This tubular core is covered by a pressure-resisting armouring formed of successive rings 2, each of which being provided (FIGS. 2 and 3) with two annular grooves 3 and 4 in the vicinity of the two ends of the ring respectively.

The pipe also includes separate annular elements 5 (FIGS. 2 and 3) interconnecting adjacent rings of the pressure-resisting armouring. The cross section of these annular connecting elements is shaped as a flattened U having two arms respectively engaged with some clearance $d$ (FIG. 3) in the two annular recesses 3 and 4 respectively.

These annular connecting elements 5 may be positioned by using any suitable process, particularly by crimping, so as to insert the edges of these elements into the annular grooves 3 and 4.

In an advantageous embodiment, the connecting elements 5 may consist of split rings (split 6, FIG. 2) or segments resiliently inserted, by radial compression, into the annular grooves 3 and 4.

It will also be possible to use connecting elements 5 formed of rings which are not split but are still resiliently deformable by radial compression, so as to facilitate their positioning between the successive rings 2.

In the embodiment illustrated by FIG. 1, the rings 2 of the pressure-resisting armouring are covered by a traction resisting armouring which, in this embodiment, is formed by two crossed layers of wires, cables or strands. This traction resisting armouring will however be omitted if the pipe is not liable to be subjected to tractive and/or torsional stresses, or when a deformation of the pipe under such stresses is deemed desirable.

The traction-resisting armouring may consist of one or more helical windings (two armouring layers 7 and 8 in the illustrated embodiment).

The pipe may be covered by one or several tightening sheaths, such as the sheaths 9 and 10 in the embodiment illustrated by FIG. 1.

These two sheaths are not bound to each other and the external sheath 10 is so designed as to exert on the internal cover 9 a constricting or clamping action which is increased by the hydrostatic pressure.

This embodiment considerably enhances the reliability of the external tightening.

The control of the quality of such sheath is difficult, but in the selected embodiment, even if a small perforation through a first of the two sheaths, a second perforation through the second sheath can be detected, no fluid leakage will occur unless the two perforations are very close to each other, which is unlikely to occur.

The two sheaths must not adhere to each other since a casual tearing of the external sheath must not be transmitted to the internal sheath. It might be advantageous to place between the rings 2 of the pressure-resisting armouring, spacing elements or resilient separating elements, for example corrugated rings 11 (FIG. 1) or, as illustrated by FIG. 5, washers 14 of elastomeric or plastic material.

These spacing elements will permit to maintain, during the construction of the pipe, a substantially uniform spacing between the successive rings 2 of the pressure-resisting armouring but also, to prevent the rings from being compressed together, under the action of their own weight, hen the flexible pipe is vertical.

In a flexible pipe structure according to the invention, the provision of two annular grooves 3 and 4 in the internal wall of each ring 2 of the pressure resisting armouring has the advantage of dividing by 2 the spacing between the end face of an annular connecting element 5 and the wall of the groove, for a given lengthening of the pipe (for example when the latter is wound or passes over a direction reversing device such as a pulley), with respect to a structure wherein the rings 2 would be provided with a single central groove 12 (FIG. 4) instead of the two grooves 3 and 4.

With the arrangement of FIG. 4, the clearance is $2d$, i.e. twice the clearance $d$ of the structure according to the invention illustrated by FIG. 2.

Thus the arrangement of FIG. 2 increases the liability for the internal sheath of being extruded between the annular connecting elements 5. Such extrusion, occuring at 13 in a structure like that illustrated by FIG. 4, might result in a rapid deterioration of the tubular core 1, as a consequence of repeated pinching of the latter, occurring when the rings 2 move again toward each other after having been displaced away from each other.

According to the embodiment of the invention illustrated by FIG. 5, each ring comprises at each end means limiting the radial displacements of the rings with respect to the pipe axis, for example a shoulder $2a$ which limits the radial displacement of the adjacent ring and thereby prevents the disengagement of the successive rings of the pipe.

FIG. 6 illustrates an embodiment wherein the pressure-resisting armouring of the pipe, which comprises the rings 2, is separated from the traction resisting armouring, more particularly from the internal layer 7 of this armouring, by a layer 15 of a material (for example a plastic material) facilitating the relative sliding of these two armourings on each other, thus preventing any transmission to the rings 2, through the armouring layer 7, of a rotary movement resulting for the application of a torque to the armourings 7 and 8.

We claim:

1. An armoured flexible pipe structure comprising a plurality of successive rings each ring defining two annular grooves in the internal wall thereof in the vicinity of the end faces of the ring and separate annular elements interconnecting adjacent rings of said pipe structure, said separate annular elements having cross-sections substantially shaped as a flattened U whose two arms are respectively engaged in the annular grooves of adjacent rings with a clearance.

2. A pipe structure according to claim 1, wherein said separate annular elements are resiliently deformable by radial compression.

3. A pipe structure according to claim 2, wherein said resiliently deformable elements are split so as to facilitate the insertion thereof into said annular grooves.

4. A pipe structure according to claim 1, including resilient spacing means between adjacent rings of the pipe structure, said spacing means maintaining a substantially uniform distance between said adjacent rings.

5. A pipe structure according to claim 4, wherein said resilient spacing means comprise rings of a plastic material.

6. A new armoured flexible pipe structure according to claim 4, wherein said resilient spacing means comprise rings of an elastomeric material.

7. A pipe structure according to claim 1, wherein each ring comprises means limiting the radial displacement of the ring relative to the pipe axis so as to prevent any disengagement of adjacent rings of the pipe.

8. A pipe structure according to claim 7, wherein said means comprises a shoulder at one end of each ring extending over a portion of the adjacent ring.

9. A pipe structure according to claim 8, wherein said shoulder overlaps a resilient spacing means between said ring and an adjacent ring.

10. A new armoured flexible pipe structure comprising in combination a flexible tubular core covered by armouring layers which comprise a pressure-resisting armouring formed of a succession of rings, each ring defining two annular grooves in the internal wall thereof in the vicinity of the end faces of the ring and separate annular elements interconnecting adjacent rings, the cross-section of said annular elements being shaped as a flattened U with two arms respectively inserted in the annular grooves of adjacent rings with a clearance, and a traction resisting armouring formed of at least one helical winding covering said pressure-resisting armouring.

11. A pipe structure according to claim 10, wherein said traction resisting armouring is covered by at least one tightening sheath.

12. A pipe structure according to claim 10, wherein said traction-resisting armouring is covered by two nonadhering tightening sheaths, the external sheath exerting a constricting or clamping action on the pipe.

13. A new flexible pipe according to claim 10, wherein said pressure-resisting armouring is separated from said traction-resisting armouring by a layer of a material which facilitates a relative sliding of said armourings on each other.

14. An armoured flexible pipe structure comprising a plurality of successive rings, each ring defining two annular grooves in the internal wall thereof, and a plurality of annular elements having U-shaped cross sections, the arms of at least one U-shaped annular element engaging the adjacent grooves of a pair of adjacent rings thereby connecting said adjacent rings together, said arms engaging said annular grooves with a clearance.

15. The pipe structure according to claim 14, wherein said clearance is an axial clearance.

* * * * *